(12) United States Patent
Chowdury et al.

(10) Patent No.: US 7,916,642 B2
(45) Date of Patent: Mar. 29, 2011

(54) SYSTEM AND METHOD FOR CONGESTION CONTROL SIGNALING

(75) Inventors: Kuntal Chowdury, Plano, TX (US);
Janakiraman Senthilnathan, Nashua, NH (US)

(73) Assignee: Starent Networks LLC, Wilmington, DE (US)

( * ) Notice: Subject to any disclaimer, the term of this patent is extended or adjusted under 35 U.S.C. 154(b) by 662 days.

(21) Appl. No.: 11/502,692

(22) Filed: Aug. 11, 2006

(65) Prior Publication Data
US 2007/0036079 A1 Feb. 15, 2007

Related U.S. Application Data

(60) Provisional application No. 60/707,340, filed on Aug. 11, 2005.

(51) Int. Cl.
*G01R 31/08* (2006.01)
(52) U.S. Cl. ...................................................... 370/235
(58) Field of Classification Search .................. 370/229, 370/235, 230, 230.1, 231, 252, 254
See application file for complete search history.

(56) References Cited

U.S. PATENT DOCUMENTS

| | | | |
|---|---|---|---|
| 5,193,151 A | 3/1993 | Jain | |
| 5,497,375 A | 3/1996 | Hluchyj et al. | |
| 6,222,825 B1 * | 4/2001 | Mangin et al. | 370/235 |
| 6,577,644 B1 * | 6/2003 | Chuah et al. | 370/466 |
| 6,747,955 B1 | 6/2004 | Archer | |
| 7,058,031 B2 * | 6/2006 | Bender et al. | 370/329 |
| 7,212,537 B2 * | 5/2007 | Wybenga et al. | 370/401 |
| 7,239,636 B2 | 7/2007 | Kadambi et al. | |
| 2002/0027977 A1 | 3/2002 | Noguchi | |
| 2002/0087723 A1 | 7/2002 | Williams et al. | |
| 2002/0196743 A1 * | 12/2002 | Thalanany et al. | 370/252 |
| 2004/0022208 A1 | 2/2004 | Dahod et al. | |
| 2004/0125792 A1 | 7/2004 | Bradbury et al. | |
| 2004/0131072 A1 | 7/2004 | Khan et al. | |
| 2004/0215753 A1 * | 10/2004 | Chan et al. | 709/223 |
| 2004/0250159 A1 | 12/2004 | Tober et al. | |
| 2004/0264377 A1 * | 12/2004 | Kilkki et al. | 370/235 |
| 2005/0094668 A1 * | 5/2005 | Hanif et al. | 370/474 |
| 2005/0220069 A1 * | 10/2005 | Li et al. | 370/349 |

(Continued)

FOREIGN PATENT DOCUMENTS

| | | |
|---|---|---|
| EP | 0415843 | 3/1991 |
| WO | WO-2004/036849 A2 | 4/2004 |

OTHER PUBLICATIONS

International Search Report issued for International Patent Application No. PCT/US2006/031392.

(Continued)

*Primary Examiner* — Kwang B Yao
*Assistant Examiner* — Anh Ngoc Nguyen
(74) *Attorney, Agent, or Firm* — Wilmer Cutler Pickering Hale and Dorr LLP

(57) ABSTRACT

Systems and methods for controlling congestion on a packet data network are provided. The congestion control may be implemented between any two network nodes where a regulation of a data flow is desired to prevent a device overload from occurring. In order to provide regulation of a data flow, congestion control states are used where each state regulates the data flow in a specified manner. State transitions may occur in response to messages that include congestion information detected at a network node.

20 Claims, 8 Drawing Sheets

U.S. PATENT DOCUMENTS

| | | |
|---|---|---|
| 2005/0226154 A1* | 10/2005 | Julka et al. .................... 370/235 |
| 2006/0062238 A1* | 3/2006 | Mahendran et al. .......... 370/437 |
| 2006/0104347 A1 | 5/2006 | Callan et al. |
| 2006/0126509 A1* | 6/2006 | Abi-Nassif et al. ........... 370/235 |
| 2006/0183472 A1* | 8/2006 | Nookala et al. ............ 455/426.1 |
| 2006/0198508 A1* | 9/2006 | Delaney et al. .......... 379/221.12 |
| 2006/0221825 A1* | 10/2006 | Okano .......................... 370/229 |

OTHER PUBLICATIONS

Supplementary European Search Report mailed by European Patent Office on Feb. 26, 2010 for corresponding European Patent Application No. 06801267.3.

* cited by examiner

A11-Control Message

| 0 | 1 | 2 | 3 | 4 | 5 | 6 | 7 | Octet |
|---|---|---|---|---|---|---|---|---|
| ⇒ Message Type = [TBD] ||||||||  1 |
| (MSB) | ⇒ Home Address = [00 00 00 00H] |||||||  1 |
|  |  |  |  |  |  |  |  | 2 |
|  |  |  |  |  |  |  |  | 3 |
|  |  |  |  |  |  |  | (LSB) | 4 |
| (MSB) | ⇒ Home Agent = \<any value\> |||||||  1 |
|  |  |  |  |  |  |  |  | 2 |
|  |  |  |  |  |  |  |  | 3 |
|  |  |  |  |  |  |  | (LSB) | 4 |
| (MSB) | ⇒ Identification = \<any value\> |||||||  1 |
|  |  |  |  |  |  |  |  | 2 |
|  |  |  |  |  |  |  |  | 3 |
|  |  |  |  |  |  |  |  | 4 |
|  |  |  |  |  |  |  |  | 5 |
|  |  |  |  |  |  |  |  | 6 |
|  |  |  |  |  |  |  |  | 7 |
|  |  |  |  |  |  |  | (LSB) | 8 |
| ⇒ Normal Vendor/Organization Specific Extension: Type = [86H] |||||||| 1 |
| Length = \<any value\> |||||||| 2 |
| (MSB) | Reserved = [00 00H] |||||||  3 |
|  |  |  |  |  |  |  | (LSB) | 4 |
| (MSB) | 3GPP2 Vendor ID = [TBD] |||||||  5 |
|  |  |  |  |  |  |  |  | 6 |
|  |  |  |  |  |  |  |  | 7 |
|  |  |  |  |  |  |  | (LSB) | 8 |
| Application Type = [TBD (RN Congestion Notification)] |||||||| 9 |
| IF (Application Type = TBD (RN Congestion Notification)){ |||||||| |
| (MSB) | Application Data = \<any value\> ||||||  (LSB) | 11 |
| }Application Type = TBD; |||||||| |
| ⇒ Registration Update Authentication Extension: Type = [28H] |||||||| 1 |
| Length = [14H] |||||||| 2 |
| (MSB) | SPI = [00 00 01 00H to FF FF FF FFH] |||||||  3 |
|  |  |  |  |  |  |  |  | 4 |
|  |  |  |  |  |  |  |  | 5 |
|  |  |  |  |  |  |  | (LSB) | 6 |
| (MSB) | Authenticator = \<any value\> (keyed-MD-5 authentication) |||||||  7 |
|  |  |  |  |  |  |  |  | 8 |
|  |  |  |  |  |  |  |  | 9 |
|  |  |  |  |  |  |  |  | ... |
|  |  |  |  |  |  |  | (LSB) | 22 |

FIG. 5

A11-Control Acknowledgement Message

| 0 | 1 | 2 | 3 | 4 | 5 | 6 | 7 | Octet |
|---|---|---|---|---|---|---|---|---|
| ⇒ Message Type = [TBD] | | | | | | | | 1 |
| ⇒ Sequence Number <Integer> | | | | | | | | 1 |
| ⇒ Status = <br> [ 00H (Notification Accepted) <br> 80H (Notification Rejected – reason unspecified) <br> 83H (Notification Rejected – sending node failed authentication) <br> 85H (Notification Rejected – identification mismatch) <br> 86H (Notification Rejected – poorly formed registration update) <br> C9H (Notification Rejected – Update Not Allowed) <br> ] | | | | | | | | 1 |
| (MSB) | ⇒ Home Address = [00 00 00 00H] | | | | | | | 1 |
| | | | | | | | | 2 |
| | | | | | | | | 3 |
| | | | | | | | (LSB) | 4 |
| (MSB) | ⇒ Care-of-Address = <any value> | | | | | | | 1 |
| | | | | | | | | 2 |
| | | | | | | | | 3 |
| | | | | | | | (LSB) | 4 |
| (MSB) | ⇒ Identification = <any value> | | | | | | | 1 |
| | | | | | | | | 2 |
| | | | | | | | | 3 |
| | | | | | | | | 4 |
| | | | | | | | | 5 |
| | | | | | | | | 6 |
| | | | | | | | | 7 |
| | | | | | | | (LSB) | 8 |
| ⇒ Registration Update Authentication Extension: Type = [28H] | | | | | | | | 1 |
| Length = [14H] | | | | | | | | 2 |
| (MSB) | SPI = [00 00 01 00H to FF FF FF FFH] | | | | | | | 3 |
| | | | | | | | | 4 |
| | | | | | | | | 5 |
| | | | | | | | (LSB) | 6 |
| (MSB) | Authenticator = <any value > (keyed-MD-5 authentication) | | | | | | | 7 |
| | | | | | | | | 8 |
| | | | | | | | | 9 |
| | | | | ... | | | | ... |
| | | | | | | | (LSB) | 22 |

FIG. 6

SYSTEM AND METHOD FOR CONGESTION CONTROL SIGNALING

CROSS-REFERENCE TO RELATED APPLICATIONS

This application claims the benefit of U.S. Provisional Patent Applications No. 60/707,340, filed Aug. 11, 2005, which is hereby incorporated by reference herein in its entirety.

BACKGROUND OF THE INVENTION

The present invention relates to congestion control in a network. More particularly, the present invention relates to using congestion control signaling to control a packet data flow from one device to another device in a network.

Wireless communication systems and networks are used in connection with many applications, including, for example, satellite communications systems, portable digital assistants (PDAs), laptop computers, and mobile nodes (e.g., cellular telephones). One significant benefit that users of such applications obtain is the ability to connect to a network (e.g., the Internet) as long as the user is within range of such a wireless communication system.

Current wireless communication systems use either, or a combination of, circuit switching and packet switching in order to provide mobile data services to a mobile subscriber. Generally speaking, with circuit-based approaches, wireless data is carried by a dedicated (and uninterrupted) connection between the sender and recipient of data using a physical switching path. Once the direct connection is set-up, it is maintained for as long as the sender and receiver have data to exchange. The establishment of such a direct and dedicated switching path results in a fixed share of network resources being tied up until the connection is closed. When the physical connection between the sender and the receiver is no longer desired, it is torn-down and the network resources are allocated to other users as necessary.

Packet-based approaches, on the other hand, do not permanently assign transmission resources to a given call, and do not require the set-up and tear-down of physical connections between a sender and receiver of data. In general, a data flow in packet-based approaches is "packetized," where the data is divided into separate segments of information, and each segment receives "header" information that may provide, for example, source information, destination information, information regarding the number of bits in the packet, priority information, and security information. The packets are then routed to a destination independently based on the header information. The data flow may include a number of packets or a single packet.

In a wireless communication system, the system typically includes a wired portion and a wireless portion, with the wireless portion being between the mobile node and an antenna. The antenna usually connects to devices that convert data sent on the wires to radio signals, other devices that route data to the various antennas, and/or devices that provide data content to the mobile nodes such as web pages, email, music, or video. Sometimes these packet flows can create congestion between network devices when a number of packet data streams are being sent to a network device. This can create a problem, especially if more data is sent to a network device than it is capable of handling, which can lead to a network device failure.

SUMMARY OF THE INVENTION

Systems and methods for controlling congestion on a packet data network are provided. The congestion control may be implemented between any two network nodes where a regulation of a data flow is desired to prevent a device overload from occurring. In order to provide regulation of a data flow, at least one congestion control state is used. Each state regulates the data flow in a specified manner. State transitions may occur in response to messages that include congestion information detected at a network node.

In accordance with the present invention, certain embodiments feature a system for regulating congestion in a packet data network comprising a first node providing a data flow and a second node coupled to the first node and receiving the data flow. The first node includes a congestion control state, wherein the congestion control state regulates the data flow from the first node to the second node.

Further in accordance with the present invention, certain embodiments feature a process for regulating congestion in a packet data network comprising sending a congestion control message that includes congestion information to a first node, transitioning to a congestion control state on the first node based on the congestion control message, and regulating data flow from the first node to a second node based on the congestion control state. Some embodiments further include detecting a congestion level at the second node, and transitioning to an open-state where the data flow is unregulated for congestion control.

Still further in accordance with the present invention, certain embodiments feature a system for regulating congestion in a packet data network comprising a first mechanism for providing a data flow and a second mechanism for receiving a data flow coupled to the first mechanism. The first mechanism including a congestion control state, wherein the congestion control state regulates the data flow from the first mechanism to the second mechanism.

BRIEF DESCRIPTION OF THE DRAWINGS

The above and other advantages of the present invention will be apparent upon consideration of the following detailed description, taken in conjunction with the accompanying drawings, in which like reference characters refer to like parts throughout, and in which:

FIG. 5 is a congestion control message format in accordance with certain embodiments of the present invention;

FIG. 6 is a congestion control acknowledgment message format in accordance with certain embodiments of the present invention;

DETAILED DESCRIPTION OF THE INVENTION

In accordance with the present invention, systems and methods for controlling congestion on a packet data network are provided. The congestion control may be implemented between any two network nodes where regulation of a data flow is desired to prevent a device overload from occurring. In order to provide regulation of a data flow, congestion control states are used where each state regulates the data flow according to desired specifications. Transitions may occur from one state to another state in response to messages that include congestion information detected at a network node. The network node may be any applicable device in a communication system as one practiced in the art would appreciate.

Figure 1:
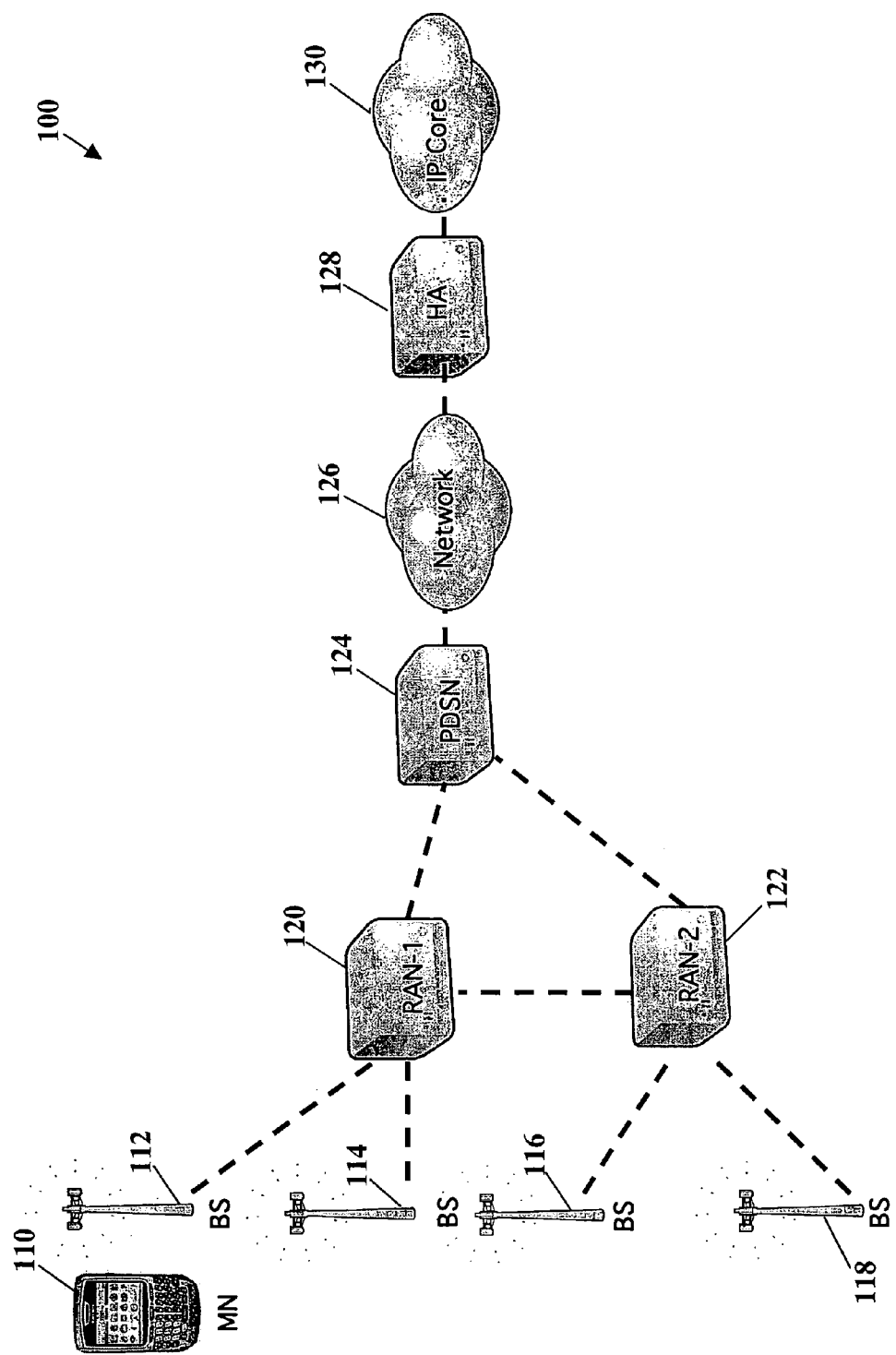
FIG. 1 is a schematic diagram of a network topology used for packet data transmissions in accordance with certain embodiments of the present invention.

FIG. 1 illustrates a network topology 100 in accordance with certain embodiments of the present invention. Network topology 100 includes mobile node 110, base stations 112, 114, 116, and 118, radio access network (RAN-1) 120, radio access network (RAN-2) 122, packet data serving node 124, network 126, home agent 128, and IP core 130. Mobile node 110 can be a cell phone, a personal digital assistant (PDA), a Blackberry, a Treo, a laptop, or any other wireless communication device. Base stations 112, 114, 116, and 118 are antennas that provide wireless signal transmissions and receive transmissions from at least mobile node 110, when mobile node 110 is in range of a base station. Base stations 112 and 114 are coupled to RAN-1 120. A RAN can include a base station, a radio network controller (RNC) (not shown), and a packet control function (PCF) (not shown). RAN-1 120 and RAN-2 122 are shown separately from base stations 112-118 for the purposes of illustration. RAN-2 122 is coupled with base stations 116 and 118. RAN-1 120 and RAN-2 122 are coupled to one another as well. As shown, the RAN may handle more than one base station.

RAN-1 120 and RAN-2 122 are coupled with PDSN 124. A PDSN provides support for the establishment, maintenance, and termination of communication sessions and serves as a connection point between a radio access network (RAN) and an IP network such as network 126. PDSN 124 is coupled to network 126. Network 126 is an IP based network containing routers and other devices to facilitate the flow of packet data. Network 126 is coupled to HA 128. HA 128 provides a fixed location in network topology 100 for the location of information regarding mobile node 110 and serves as a forwarding address to mobile node 110 when the mobile node is roaming. The HA forwards the information to wherever the mobile node is when a call is initiated. HA 128 is coupled to IP core 130. IP core 130 may be the internet or any other packet based network from which mobile node 110 can communicate with other mobile nodes on other networks, retrieve multimedia content, or receive other data such as emails. As one practiced in the art would appreciate other devices both virtual and physical can be added to network topology 100, where virtual encompasses multiple devices implemented on one device.

Certain embodiments of the invention are concerned with preventing congestion overload of devices in the network, such as in a RAN. Congestion overloads can provoke a device or system failure interrupting service if certain measures are not initiated. In some embodiments, a congestion protocol is used to regulate the data packet traffic being sent from PDSN 124 to RAN-1 120, and more particularly a PCF within RAN-1 120. A radio network controller (RNC) also within RAN-1 120 can be used to detect an overload condition. This overload condition may develop when RAN-1 120 can no longer handle the overload condition with an internal overload control mechanism. RAN-1 120 can send an A11-Control message to PDSN 124. This message from RAN-1 120 provides appropriate information about the level of congestion that is being encountered. This information assists PDSN 124 in making decisions about how to regulate the data flow.

PDSN 124 can take the appropriate action to regulate the data flow and respond back to RAN-1 120 with an A11-Control Acknowledgement message.

Figure 2:
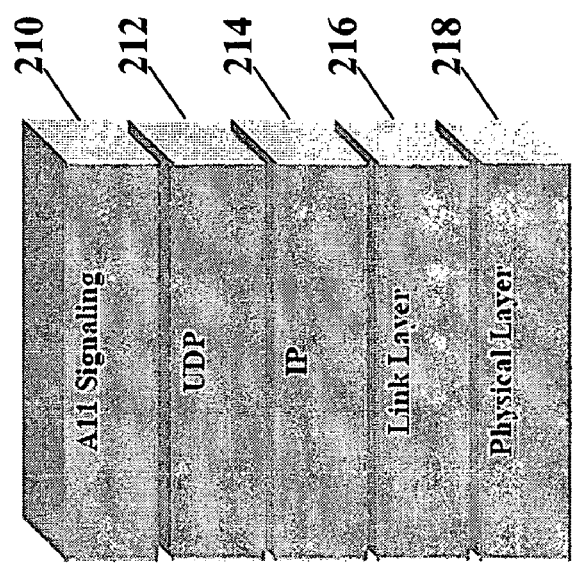
FIG. 2 is diagram of a protocol stack used with packet data transmission in accordance with certain embodiments of the present invention.

FIG. 2 illustrates a protocol stack that is used in accordance with certain embodiments of the present invention. At the topmost level 210, A11 Signaling is used between PDSN 124 and RAN-1 120. A11 Signaling 210 carries information between PDSN 124 and RAN-1 120 and can be modified to carry congestion level information between PDSN 124 and RAN-1 120. User Datagram Protocol (UDP) 212 is a stateless and connectionless protocol that runs on top of IP networks and is used typically in applications such as real-time audio or video where there is no time to transmit dropped packets. IP 214 is a packet-based protocol for delivering data across networks. This protocol defines an IP datagram as the basic unit of information sent over the Internet. The IP datagram is characterized by an IP header followed by information. Link layer 216 provides a functional and procedural mechanism to transfer data between network entities and can provide a mechanism to detect and correct errors that may occur in Physical layer 218. Physical layer 218 provides a mechanism for transmitting raw bits and is concerned with things such as which frequencies to broadcast on. In some embodiments of the invention, the regulation of traffic entails controlling aspects of one or more of the protocols of FIG. 2.

Figure 3:
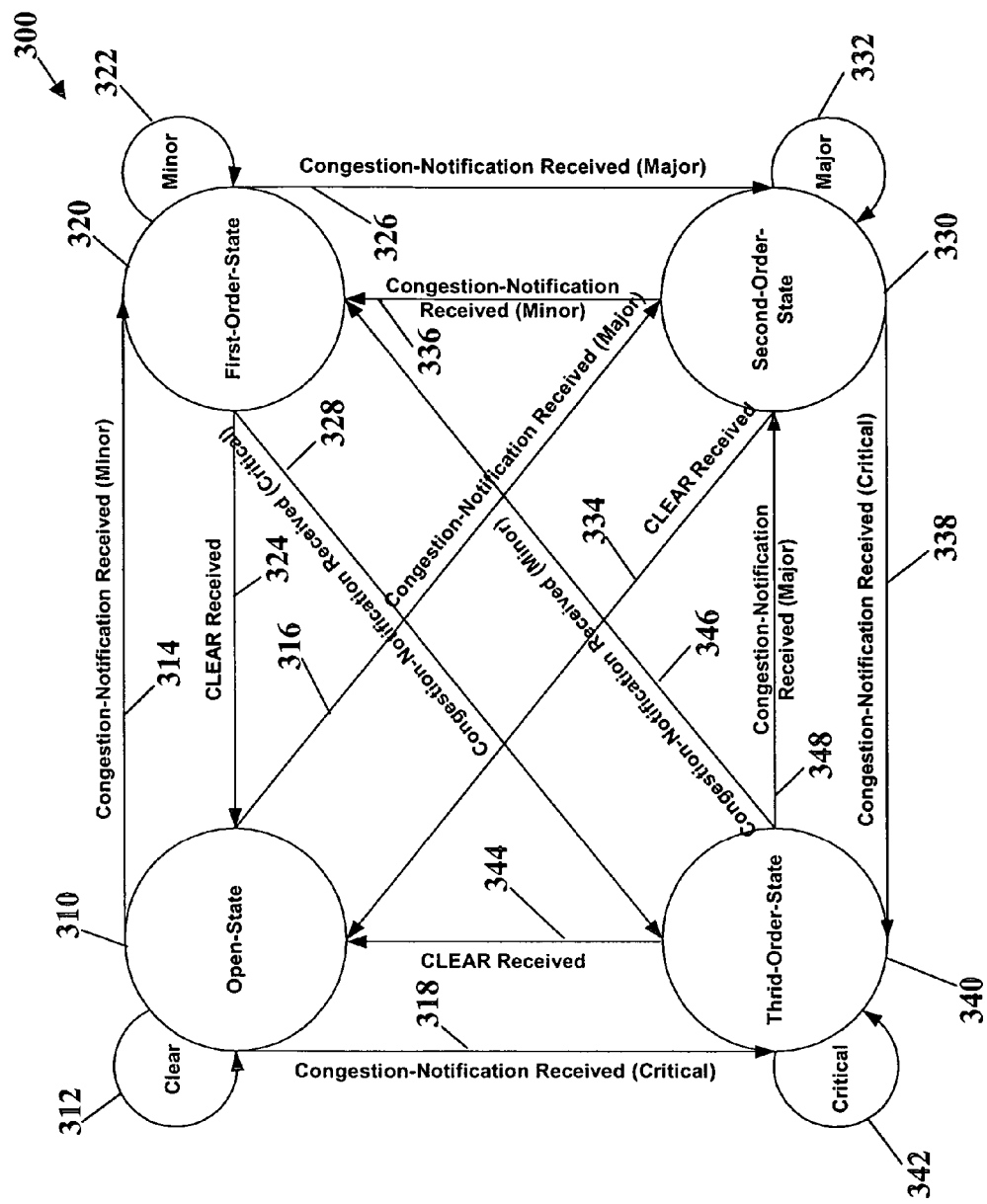
FIG. 3 is a schematic diagram of the states involved with congestion control in accordance with certain embodiments of the present invention.

FIG. 3 illustrates a state-based traffic regulation diagram 300 and possible transitions between states in accordance with certain embodiments of the invention. Four states are illustrated in state diagram 300 including an open-state 310, a first-order-state 320, a second-order-state 330, and a third-order-state 340. In open-state 310, all data flows are passed. This is the default state for network topology 100. In first-order-state 320, certain information is discarded or limited and new sessions can be rejected. In second-order-state 330, more information is discarded and new sessions are rejected. In third-order-state 340, all traffic is discarded and new sessions are rejected. More particularly, Table 1 shows how traffic is regulated in accordance with some embodiments of the invention.

TABLE 1

|  | Open-State | First-Order-State | Second-Order-State | Third-Order-State |
| --- | --- | --- | --- | --- |
| Best Effort Traffic | Allow | Discard | Discard | Discard |
| Assured Forwarding Traffic | Allow | Rate Limit | Discard | Discard |
| Expedited Forwarding Traffic | Allow | Allow | Rate Limit | Discard |
| New IP Sessions | Allow | Block and Discard | Block and Discard | Block and Discard |
| PPP and MIP Sessions | Allow | Reject | Reject | Reject |

Table 1 illustrates three types of packet data traffic including best effort traffic, assured forwarding traffic, and expedited forwarding traffic in accordance with certain embodiments of the invention. These three types represent the priority levels for data traffic. This priority is reflected in the states and how a data flow is regulated. For example, expedited forwarding traffic is the last type of traffic to be discarded, while best effort traffic is the first type of traffic to be discarded. Additionally, in some states new IP sessions are blocked and discarded. The IP session may be blocked, for example, by disallowing any more A10 connections and Traffic Flow Templates (TFT) to be established for existing Point-to-Point Protocol/Mobile IP (PPP/MIP) sessions. Blocking and discarding the new IP sessions prevent existing mobile nodes from securing additional bandwidth (e.g., a new IP session may be opening a streaming video clip on a web site while surfing the web). New PPP and MIP sessions are also rejected. This prevents new mobile nodes from starting a session with the network. As one practiced in the art would appreciate, more or less states may be used to regulate traffic and the data traffic may be classified by other metrics.

FIG. 3 illustrates transitions among the states in accordance with certain embodiments of the invention. Each state can make four transitions and this is based on the number of states involved. In this example, four states are involved. The four transitions possible are to remain in the same state or to transition to any of the other three states. Open state 310 remains in open-state 310 in a clear transition 312. Open-state 310 transitions to first-order-state 320 when a congestion-notification 314 is received. A transition is made from open-state 310 to second-order-state 330 when a congestion-notification 316 is received. Open-state 310 transitions to third-order-state 340 when a congestion-notification 318 is received.

First-order-state 320 similarly transitions to itself and other states. First-order-state 320 transitions to itself with a minor transition 322. A transition to open-state 310 is initiated when first-order-state 320 receives a clear notification 324. First-order-state 320 transitions to second-order-state 330 after receiving a congestion-notification 326 and transitions to third-order-state 340 when a congestion-notification 328 is received. Second-order-state 330 transitions to itself with a major transition 332, to open-state 310 with a clear notification 334, to first-order-state 320 with a congestion-notification 336, and to third-order-state 340 with a congestion-notification 338. Third-order-state 340 transitions to itself with a critical transition 342, to open-state 310 with a clear notification 344, to first-order-state 320 with a congestion-notification 346, and to second-order-state 330 with a congestion-notification 338.

Figure 4:
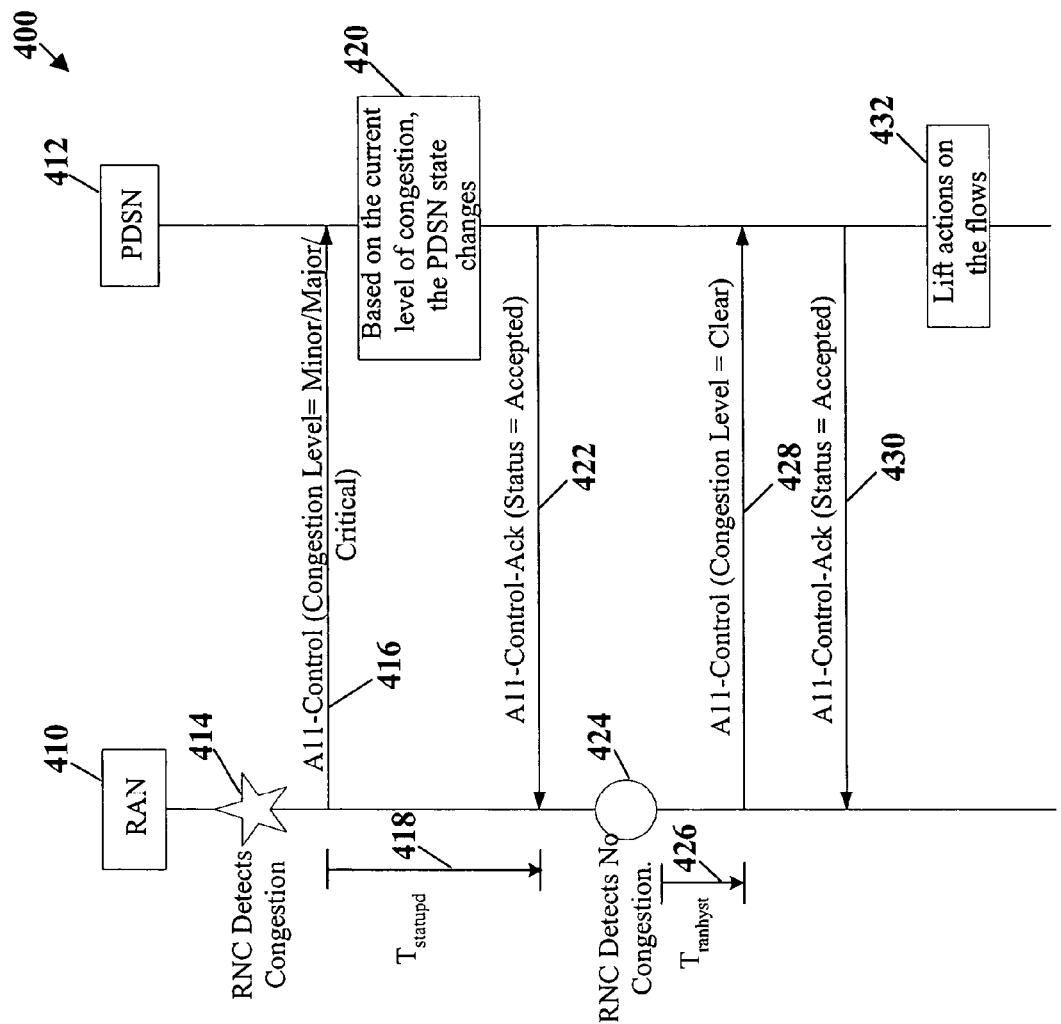
FIG. 4 is a call flow diagram in accordance with certain embodiments of the present invention.

FIG. 4 illustrates control message flows 400 in accordance with certain embodiments of the present invention. Control message flow 400 includes a RAN 410 and a PDSN 412. RAN 410 can include a base station, a radio network controller (RNC), and a packet control function (PCF), which alone or in combination may issue control messages, implement timing mechanisms, and/or detect congestion. At step 414, RNC detects congestion that cannot be controlled by an internal mechanism. This internal mechanism can be implementation specific, for example, reallocating memory to increase buffer depth, reallocating CPU resources to process packets at a faster rate, removing supplementary functions (e.g., compression) on the packets to speed up packet handling, and/or any other applicable method. RAN 410 (or a PCF) sends an A11-Control message to PDSN 412 in step 416. The control message includes congestion level information set to the appropriate level of congestion in RAN 410. The appropriate level of information may be selected by the RNC or the PCF within RAN. The PCF starts a timer ($T_{statupd}$) in step 418. The length of time the timer is set based upon the length of time a state transition typically lasts. The timer may be set for different times if the different state transitions take varying amounts of time to complete the transition.

In step 420, PDSN 412 validates A11-Control message's authenticity. If validation is successful, PDSN 412 takes appropriate steps to begin regulating the traffic or data flow heading towards RAN 410. The state transitioned to in step 412 may therefore be dependent upon the congestion level indicated in the A11-Control message. In some embodiments, PDSN 412 is coupled with multiple RANs and can regulate data flow on each of the multiple RANs independently of the other RANs. PDSN 412 sends back an A11-Control Acknowledgement message to RAN 410. This message may include an appropriate status code, such as one set to convey "Notification Accepted." When this status code is received, the PCF can stop the timer ($T_{statupd}$). In some embodiments, the message may not be received before the timer elapses. This and other conditions will be further explained below. In step 424, the RNC detects the congested condition has eased off. In some embodiments, in order to avoid network oscillation between congested and non-congested states, a hysteresis timer ($T_{ranhyst}$) is implemented in RAN 410. The timer may be specifically implemented in the PCF. The hysteresis timer introduces a delay before the transition to open-state is made. The timer in some embodiments is applied to transitions between other states as well. The timer may be based upon an algorithm that weighs previous actions to determine the length of the delay introduced. When the hysteresis timer expires in step 426, RAN 410 sends an A11-control message in step 428 indicating the congestion level is now clear. If the A11-Control message passes the validation check, PDSN 412 acknowledges receipt of the control message and indicates a state change to open-state with an A11-Control Acknowledgement message in step 430. As in step 422, PDSN 412 sets the appropriate status code, such as one to convey "Notification Accepted." PDSN 412 makes the transition to open-state in step 432.

As illustrated by the possible transitions in FIG. 3, other call flows are also possible. For example, the RNC may detect the congestion condition has worsened even while in the first-order-state and decide to send a control message to transition to a second-order-state. Another example is a transition from a third-order-state to a first-order-state. When the RNC detects the congestion level dictates such a transition. The decision to move to an intermediate state may be based upon an algorithm or a state machine, which remembers prior outcomes to determine that an intermediate state is a more appropriate transition. An algorithm that may be used is:

$$\left(\frac{1}{T_{current} - T_{stamp}}\right)[Sv] + n + (n-1) + \ldots + (n-m) = S_{TV}$$

where $T_{current}$ is the current time, $T_{stamp}$ is a time stamp of when the state transition occurred, Sv is a state value that is assigned to each state, n, n−1, and (n−m) are prior instances of the first formula, and $S_{TV}$ is a state transition value. The algorithm may be limited to a fixed number of entries. After this limit is surpassed the newest entry replaces the oldest entry. In this algorithm, the value decisions are made against $S_{TV}$. $S_{TV}$ can be compared against a number of thresholds to determine if an intermediate state transition is appropriate, and to which intermediate state a transition should be made. The algorithm may be included as a modifier in the RNC congestion detection decision.

In certain embodiments, if the PDSN receives an A11-Control message with the same congestion level as the previous message, the PDSN acknowledges the control message with an A11-Control Acknowledgement message and maintains its present state. If no A11-Control Acknowledgement message is received by the RAN after an A11-Control message is sent and the timer ($T_{statupd}$) expires, then the RAN may resend the same A-11 Control message a configurable number of times.

The status code of the A11-Control-Acknowledgement message may be used to convey error conditions in some embodiments. A type of error code that may be used is an A11-Control message validation failed error code. Upon receiving this error code, the RAN may not resend the A11-Control message and instead notify an administrator of the error. Another possible error code is an identification mismatch. The PDSN may send this error code in the A11-Control Acknowledgement message if the A11-Control message included an invalid ID field, such as a timestamp outside of the tolerance threshold. The A11-Control Acknowledgement message may also include a suggested Identification value for the RAN to retry. A poorly formed message error code is another possibility. This error code is sent by the PDSN in the A11-Control-Acknowledgement message if the corresponding A11-Control message is missing mandatory fields and/or if the fields cannot be successfully parsed by the PDSN. The RAN may retry sending the A11-Control message for a configurable number of times to rectify the problem after receiving this error code. Another possible type of error code is an update not allowed error code. This error code is included in the A11-Control-Acknowledgement message by the PDSN if the update from the RAN is not supported due to administrative policy. The RAN may send the A11-Control message to a different PDSN upon receiving this error code.

In some embodiments, the A11 control protocol used for A11-Control messages and A11-Control Acknowledgement messages is the same format as the one used for A11 registration request/response messages. The congestion control messages may use a specific type field to notify the receiver, such as a RAN, that these are congestion control protocol messages rather than a request for an A10 setup or teardown. The A11-Control message may include one or more of the following pieces of information: an A11 message type, a sequence number, a home address, a home agent, an identification, a normal vendor/organization specific extension, and a registration update authentication extension. FIG. 5 illustrates an A11-Control message in accordance with certain embodiments of the present invention. The A11-Control message can include the following fields: message type, home address, home agent, identification, normal vendor/organization specific extension: type (including length), 3Gpp2 Vendor ID, application type, application data, and registration update authentication extension: type (including length, SPI, and authenticator). FIG. 6 illustrates an A11-Control Acknowledgement message in accordance with certain embodiments of the present invention. The A11-Control Acknowledgement message can include the following fields: message type, sequence number, status, home address, care-of-address, identification, and registration update authentication extension: type (including length, SPI, and authenticator). As one practiced in the art would appreciate certain aspects of FIG. 5 and FIG. 6 may be modified, including adding or deleting fields for a specific implementation.

Figure 7:
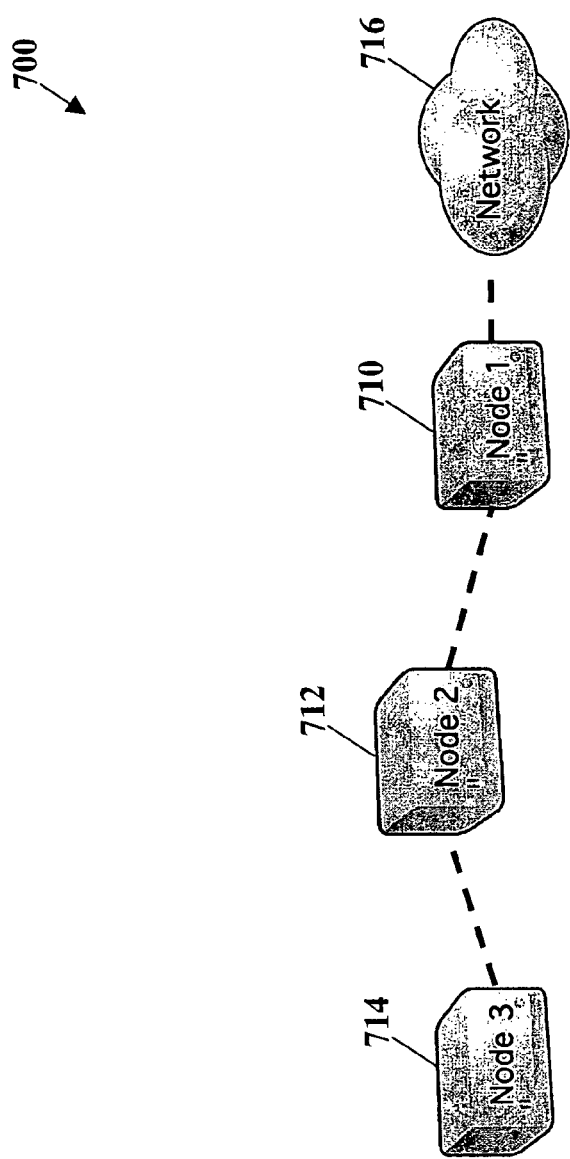
FIG. 7 is a schematic diagram of a nodal network topology in accordance with certain embodiments of the present invention.

FIG. 7 illustrates a nodal network 700 in accordance with certain embodiments of the present invention. Nodal network 700 includes node 1 710, node 2 712, node 3 714, and network 716. Node 1 710 can be a packet data serving node (PDSN), an access gateway, a border router, a content server, a Gateway General packet radio service Support Node (GGSN), a Support General packet radio service Support Node (SGSN), an application server, a media gateway function, a multimedia resource function, a Proxy-Call Session Control Function (P-CSCF), an Interrogating-Call Session Control Function (I-CSCF), a radio access network (RAN), a packet control function (PCF), a radio network controller (RNC), a home agent, a foreign agent, a base station, or a mobile node. As one practiced in the art would appreciate, node 2 712 and node 3 714 can include any combination of the devices named for node 1 that would be included together on a network. Network 716 can be any combination of devices, an Internet, or an intranet.

In an example with reference to FIG. 7, node 1 710 may be a content server, node 2 712 a PDSN, and node 3 714 a RAN. In some embodiments, congestion control is implemented on node 1 710 with respect to node 2 712, and again on node 2 712 with respect to node 3 714. In other embodiments, node 1 710 may be a GGSN, node 2 712 an SGSN, and node 3 714 a base station. The congestion control can be implemented on node 1 710 with respect to node 2 712. In certain embodiments, the control and control acknowledgement message can be implemented in the registration request/registration acknowledgement protocol or similar message protocol used between the nodes, or any other applicable signaling protocol. A Starent ST-16, manufactured by Starent Networks Corporation, may be used to implement one or more of the nodes described with reference to FIG. 7.

Figure 8:
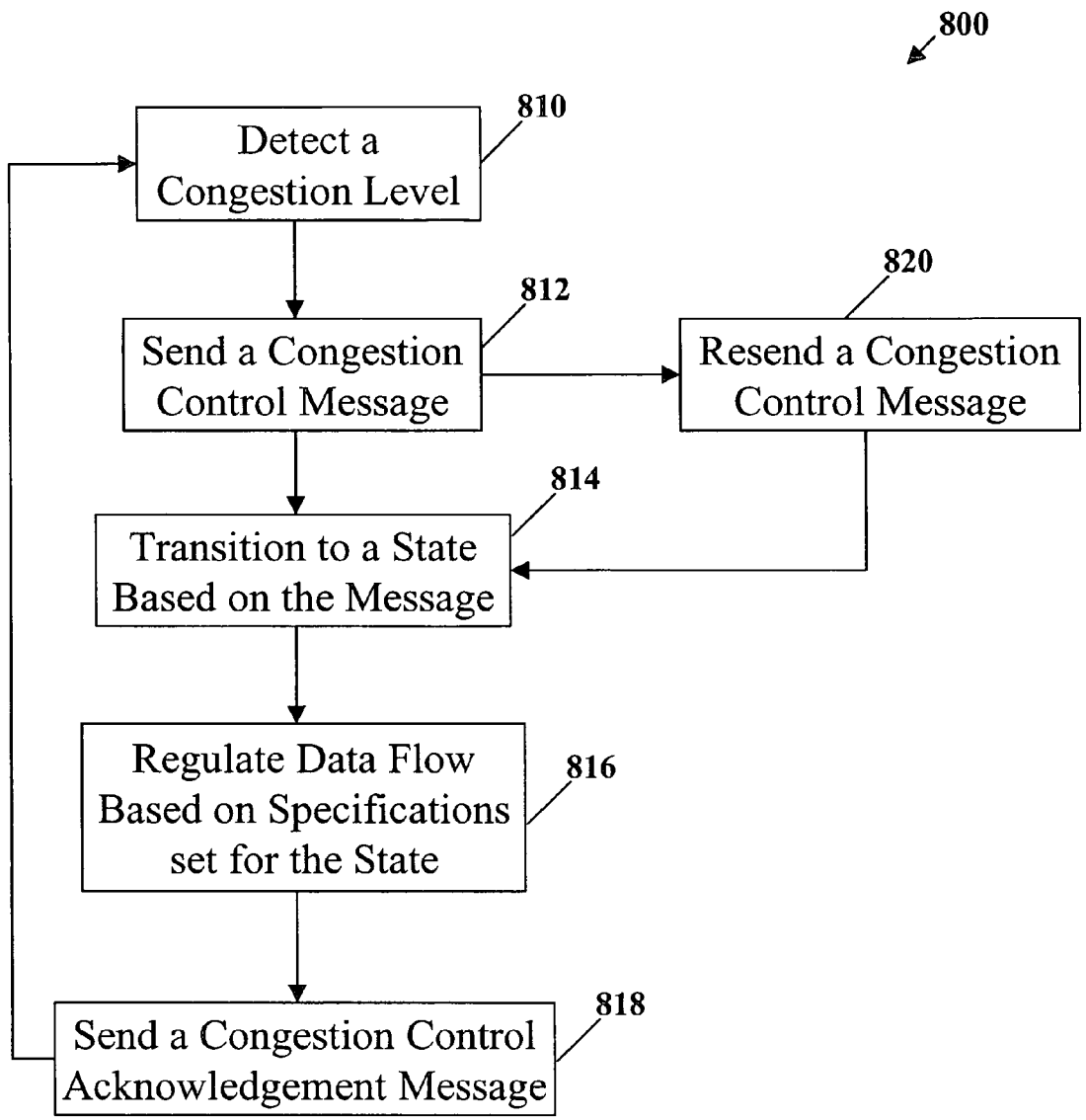
FIG. 8 is a flow diagram of steps involved in congestion control in accordance with certain embodiments of the present invention.

FIG. 8 is a flow diagram 800 describing the steps involved in a congestion control process in accordance with certain embodiments of the invention. Flow diagram 800 begins with step 810, where the congestion level present at a network node (such as node 2 712) is detected. A congestion control message is sent in step 812 to another network node (such as node 1 710) to identify the current level of congestion. In step 814, the other network node (such as node 1 710) transitions to a state based on the congestion control message. In some embodiments, the message identifies that the same state should be maintained and so the other network node (such as node 1 710) remains in its current state. The other network node (such as node 1 710) proceeds to regulate data flow based on specifications set for the state. An example of state specific specifications can be found above in table 1. In step 818, a congestion control acknowledgement message is sent from the other network node (such as node 1 710) to the network node (such as node 2 712). In certain embodiments, a timer is used to determine if another congestion control message should be sent. In step 820, no congestion control acknowledgement message was received and so the congestion control message is resent. The congestion control message may be resent a configurable number of times. After the acknowledgement is received in step 818, network node (such as node 2 712) detects a congestion level again in step 810, restarting the process.

In some embodiments, software needed for implementing a process includes a high level procedural or an object-orientated language such as C, C++, C#, Java, or Perl. The software may also be implemented in assembly language if desired. In certain embodiments, the software is stored on a storage medium or device such as read-only memory (ROM), programmable-read-only memory (PROM), or magnetic disk that is readable by a general or special purpose processing unit to perform the processes described in this document.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow.

We claim:

1. A system comprising:
    a first node for providing a data flow including packets of data;
    a plurality of second nodes in communication with the first node and for receiving the data flow, the second nodes for communicating with mobile terminals; and
    the first node receiving control messages from the second nodes indicating congestion information regarding congestion at the second nodes, and in response to the congestion information, setting the first node in one of a plurality of congestion control states;
    wherein the congestion control state regulates the data flow from the first node to the second nodes such that the data flow from the first node to the second nodes in a congestion control state is different from the data flow in the absence of a control message from the second nodes to the first node indicating congestion at from the second nodes;
    wherein the first node includes a first state of congestion control, a second state of congestion control, and an open-state, the open-state allowing data flow, the first and second congestion states being different, with each providing at least that some types of packets are stopped and some types of packets are rate-limited;
    wherein the first node regulates data flow to each of the plurality of second nodes independently of the data flow to other second nodes, such that the first node is capable of being in an open state with respect to one second node and in the first state with respect to a different second node.

2. The system of claim 1, wherein the congestion control state is acknowledged by an A11-Control Acknowledgement message from the first node to the second node that includes at least one of a home address and an identification.

3. The system of claim 1, wherein the first node includes a packet data serving node (PDSN) and the second node includes a radio access network (RAN).

4. The system of claim 3, wherein the RAN includes a radio network controller (RNC), wherein the RNC detects a congestion level based on the data flow and causes congestion information to be sent to the PDSN, and wherein the congestion control state is set based upon the congestion level detected by the RNC.

5. The system of claim 3, wherein the RAN includes a packet control function (PCF), the PCF implementing a timer to delay a switch from a congestion regulating state to an open-state.

6. A method comprising:
    receiving at a first node a congestion control message from a second node, the control message including congestion information, the first node for sending and receiving packet data in a packet data network for use with mobile terminals;
    transitioning to a congestion control state on the first node based on the congestion control message, including a first congestion state and a second congestion state;
    regulating data flow from the first node to a second node, which sends and receives packet data in a packet data network, based on the congestion control state;
    wherein the data flow includes a plurality of priority levels, and wherein data is allowed to flow from the first node to the second node in the open state;
    the first and second congestion states being different, with each providing at least that some types of packets are stopped and some types of packets are rate-limited.

7. The method of claim 6, further comprising:
    detecting a congestion level at the second node; and
    transitioning from a congestion control state to an open-state where the data flow is unregulated for congestion control.

8. The method of claim 7, further comprising waiting an amount of time before transitioning from a congestion control state to the open-state.

9. The method of claim 6, wherein the first node includes a packet data serving node (PDSN) and the second node includes a radio access network (RAN).

10. The method of claim 6, wherein the congestion control message includes an A11-Control message.

11. The method of claim 6, further comprising sending an acknowledgement message from the first node to the second node after the transition completes.

12. The method of claim 6, wherein the congestion control state rejects new point-to-point protocol and mobile-IP sessions and blocks and discards new IP sessions.

13. A system comprising:
    a packet data serving node (PDSN) providing a data flow, including packets of data, to at least one radio access network (RAN);
    the PDSN receiving a control message from a first RAN indicating congestion information and in response to the congestion information, setting the PDSN into one of a plurality of states, including a first congestion control state and an open state, the open state indicating the absence of congestion at the first RAN;
    wherein the congestion state regulates the data flow from the PDSN to the first RAN in a first manner in the event of an open state and in a second manner that is different from the first manner in the first congestion control state;
    wherein the PDSN maintains a plurality of congestion control states, including the first congestion control state and a second congestion control state, in addition to the open state;
    wherein traffic from the PDSN includes a plurality of priority levels, and wherein all traffic is allowed to flow from the PDSN to the first RAN in the open state and wherein lower priority traffic is discarded for at least one priority level when the PDSN is in the first congestion control state, and wherein traffic other than the lower priority traffic is discarded for at least one priority level when the PDSN is in the second congestion control state.

14. The system of claim 13, wherein the PDSN receives congestion information from a plurality of radio access networks (RANs), and wherein the PDSN regulates data flow to each of the plurality of RANs independently of the date flow to other RANs, such that the PDSN is capable of being in an open state with respect to a first RAN and in a first congestion control state with respect to a second RAN.

15. The system of claim 13, wherein traffic includes a plurality of priority levels, such that packets with certain defined priority levels are discarded in the second congestion control state but are not discarded in either the first congestion control state or in the open state.

16. The system of claim 13, wherein the PDSN allows new internet protocol (IP) sessions in the open state but blocks and discards new IP sessions in the first congestion control state.

17. The system of claim 13, wherein the PDSN allows new point-to-point protocol (PPP) sessions in the open state but blocks and discards new PPP sessions in the first congestion control state.

18. The system of claim 13, wherein in the first congestion control state, best effort traffic is discarded.

19. The system of claim 13, wherein in the first congestion control state, assured forwarding traffic is discarded.

20. The system of claim 13, wherein in the first congestion control state, expedited forwarding traffic is discarded.

* * * * *